March 6, 1951

P. C. GOLDMARK 2,543,772

COLOR TELEVISION

Filed Oct. 3, 1946

2 Sheets-Sheet 1

INVENTOR
PETER C. GOLDMARK
BY
Pennie, Edmonds, Morton & Barrows
ATTORNEYS

March 6, 1951 P. C. GOLDMARK 2,543,772

COLOR TELEVISION

Filed Oct. 3, 1946

2 Sheets-Sheet 2

INVENTOR
PETER C. GOLDMARK
BY
Pennie, Edmonds, Morton & Barrows
ATTORNEYS

Patented Mar. 6, 1951

2,543,772

UNITED STATES PATENT OFFICE 2,543,772

COLOR TELEVISION

Peter C. Goldmark, New Canaan, Conn., assignor to Columbia Broadcasting System, Inc., New York, N. Y., a corporation of New York Application October 3, 1946, Serial No. 700,946

21 Claims. (Cl. 178—5.4)

This invention relates to television, and particularly to the balancing of component portions of a television video signal. The invention particularly contemplates the balancing of component color signals in a color television system and the balancing of component portions of a color or black-and-white video signal to decrease flicker. In certain aspects the invention has somewhat wider application.

In television systems it is often desirable to be able to change the magnitudes of certain portions of a television video signal with respect to other portions so as to obtain a more desirable balance between the portions. For example, in color television wherein an object field is sequentially scanned in a plurality of primary colors to obtain a composite multicolor video signal, it is often desirable to change the magnitude of signal portions representing one component color with respect to those portions representing another component color. The need for this arises out of various factors, particularly the different transmission factors of color filters and the different response of photoelectric surfaces in transmitting tubes to light of different colors. This problem, and a method and apparatus for changing the balance of color television signals, are described in my Patent No. 2,406,760, issued September 3, 1946.

The need for changing the balance of different portions of a video signal may also arise in transmitter systems wherein light images are presented to the transmitter tube successively through different optical paths. In such case, unless the optical paths are identical, the signal portions resulting from the operation of different optical paths may differ somewhat in magnitude and cause flicker at the receiver. It will be understood that flicker may result not only from the transmission of successive fields at too low a frequency, but also from differences in light intensity of successive fields. As a particular example, this problem may arise in connection with the continuous film scanning apparatus described in my U. S. Patent No. 2,287,033, issued June 23, 1942, in which different optical elements, such as small lenses or mirrors, are successively employed in sequence in the scanning of a continuously moving film. An embodiment of this system for color television is shown in my application Serial No. 355,840, filed September 7, 1940, now Patent No. 2,480,571, granted August 30, 1949.

While it is possible to adjust the elements in different optical paths so that the same amount of light is transmitted through each, considerable care and time may be required. Generally the lenses passing larger amounts of light must be stepped down, thus decreasing the signal-to-noise ratio. By changing the magnitude of portions of the video signal produced from different optical paths, corrections can be made with facility without impairing the signal-to-noise ratio. This is important to secure a high quality signal.

There have heretofore been proposed apparatus for changing the balance between different portions of a television signal. In one system which has been employed with success, a composite color video signal, for example, is fed into an amplifier comprising a plurality of channels. Different color signals are passed in respective channels and the remainder eliminated, the magnitudes of the signals in the several channels altered as desired, and the results combined.

In another system, the composite color video signal is applied to a single amplifying tube of the variable mu type, and control waves are applied to change the amplification factor of the tube for signal portions of different color. This latter system has certain disadvantages which limit its usefulness. In order to change the amplification factor of the tube by the application of a control wave, the tube must have a curved characteristic. Hence, if large signal voltages are applied to the control grid of the tube, distortion will result due to the curvature of the characteristic. Such distortion may be minimized by employing small input signal voltages, but in such case it is difficult to reinsert the D.-C. component, since D.-C. reinserters require considerable signal voltages for proper operation. It is, of course, necessary to reinsert the D.-C. in applying the composite video signal to the variable mu tube to obtain proper operation.

The present invention is designed to provide a very simple and effective apparatus for changing the balance between different portions of a video signal without distortion and without difficulties due to D.-C. reinsertion. To do this, the invention makes use of an electron multiplier for multiplying a composite video signal, and sequentially alters the voltage applied to one or more of the stages of the multiplier. This sequential alteration is effected in synchronism with the sequential alternations of the different component portions of the composite video signal so as to change the relative magnitudes of the component portions and hence alter the balance therebetween.

The invention particularly contemplates changing the balance of the video signal in an electron multiplier built into the transmitting tube. In the following description of specific embodiments, a tube of the image dissector type is employed which has a built-in electron multiplier for the video signal. Other types of transmitter tubes also have built-in electron multipliers, for example, the so-called image orthicon. In the transmitter pickup tube the D.-C. component and black levels are in their most precise form. Later D.-C. reinsertion is only approximate. Hence, this feature of the invention results in important advantages.

While it is preferred to employ an electron multiplier built into the transmitting tube, it is possible to supply the composite video signal to a separate tube having an electron multiplier associated therewith and changing the balance of the video signal in such a tube. In such event the apparatus may be employed at either the transmitter or receiver ends of the system.

The change in voltage or accelerating potential applied to one or more stages of the electron multiplier is conveniently and simply effected by means of one or more commutators which alter the value of the resistance in the voltage divider feeding the corresponding stage or stages. If desired, however, other means may be employed.

The apparatus of the present invention will be found to be extremely simple and is highly effective. Wide variations in multiplication by the electron multiplier are possible while preserving excellent linearity for each portion of the video signal. Such linearity is particularly important in color television, since different color signals have different magnitudes, and non-linearity impairs the color values. No difficulties due to D.-C. reinsertion arise and, in the specific embodiments described, only a few inexpensive components need be added to the television system.

The invention will be more fully understood from the following detailed description of specific embodiments of the invention, taken in conjunction with the drawings, in which.

Figure 1:
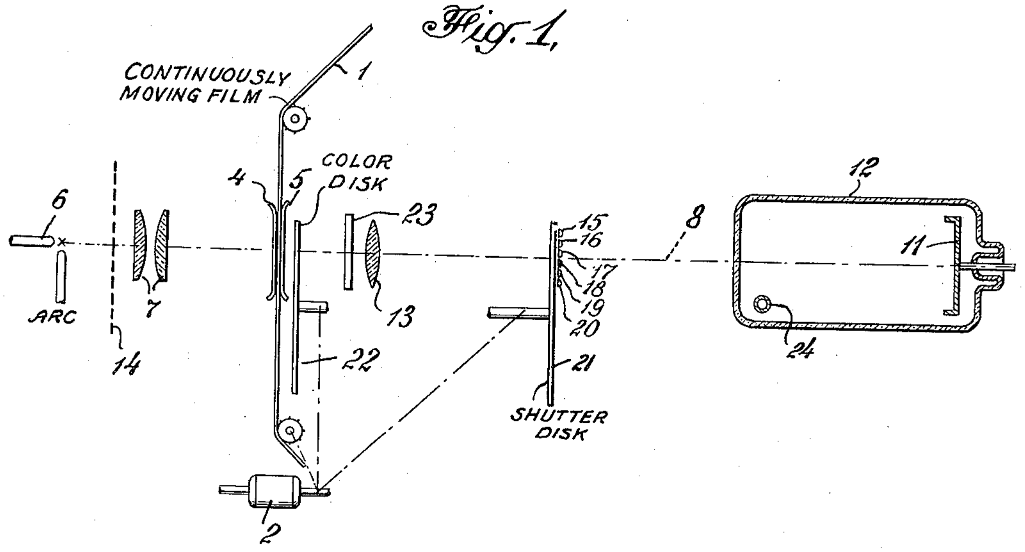
Fig. 1 is a schematic view showing a color television film pickup unit with which the invention may be employed.

As an example of particular apparatus with which the present invention may be employed, Fig. 1 shows a color television film scanner of the continuously moving film type. Color film 1 of any suitable type, such as Kodachrome, is driven at constant speed by motor 2. The film passes between gates, or apertured guides, 4 and 5, which keep it in proper position. Commonly the film will be driven at the rate of 24 film frames per second, which is standard at the present time. The film is illuminated by light from a suitable source, such as arc 6 and condenser lens 7. The optical axis about which the elements are aligned is indicated by the dot-dash line 8. An apertured heat disk may be provided between the condenser lens and the film to shield the film from the intense heat of the arc as much as possible. This forms no part of the present invention and is not shown, for simplicity.

The system for projecting images from the film to the cathode 11 of the transmitter tube 12, which is of the Farnsworth image dissector type, is a modification of that shown in Figs. 13 and 14 of my Patent No. 2,287,033, issued June 23, 1942. As there described, the projection lens 13 is positioned to form an enlarged virtual image of the film in a plane behind the film, such as plane 14. Small lenses 15—20 operate successively to project virtual images in the plane 14 to the cathode 11 of the image dissector tube. The small lenses 15—20 are rendered successively operative by the shutter disk 21 driven by motor 2. The shutter disk consists of an opaque disk having slots cut therein which successively uncover the small lenses as the disk rotates.

In the path of light from the film is positioned a color filter disk 22 having segments of different primary colors arranged so that cathode 11 is successively illuminated with light of different primary color. The number of filter segments and speed of rotation of the disk are usually such as to expose cathode 11 to successive primary colors during successive field scansions. The filter segments may be of any suitable design such as, for example, that shown in Fig. 5 and described in detail in my Patent No. 2,304,081, issued December 8, 1942. An infra-red filter 23 is placed in the path of light to the scanning tube, since photoelectric surfaces are usually sensitive to infra-red and thus correct color rendition would be impaired.

Transmitter tube 12 is provided with focusing and deflecting coils and associated sawtooth generators in the usual manner for scanning images at desired line and field frequencies. The coils and generators are omitted in the drawing for simplicity. It will be assumed as an example that the field frequency is 144 fields per second. Since the film speed is 24 film frames per second, 6 field scansions will take place during one film-frame period. Lenses 15—20 are rendered successively operative during successive field scansions to compensate for the movement of the film 1 during each field scansion period. With such operation, the scanning area at cathode 11 may remain the same even though the film is continuously moving. With the above standards and three-colors, a given lens always scans for a given color. Thus the separate color disk 22 may be omitted and filters placed in the slots of the shutter disk 21, or over the lenses themselves. Further details of the construction and operation of this type of film scanner have been given in my above-mentioned patent and application so that further elaboration here is unnecessary.

It will be noted that the optical paths through different lenses 15—20, while very similar, are slightly different. Due to this, and also due to the fact that the lenses are usually quite small, the amount of light passing through different lenses may be slightly different. Thus the portions of the video signal resulting from light passing through different lenses may be slightly different in magnitude, even though the same color filter is in operation. If uncorrected, such differences would cause different fields of the same color at a receiver to have slightly different brightnesses and would tend to cause flicker. It is possible by careful adjustment of the position and apertures of lenses 15—20 to equalize the amount of light passing through the lenses. However, the present invention provides means for altering the balance in the video signal itself in an expeditious manner to correct for any slight differences in the several optical paths, and without impairing the signal-to-noise ratio.

Transmitter tube 12 contains an apertured finger 24 across which the electron image from cathode 11 is deflected for scanning purposes. This operation of the image dissector is well known and need not be described in detail here. Finger 24 will be understood to contain an electron multiplier for multiplying the video signal passing through the aperture.

A lens such as 15 may be considered as producing a series of signal waves during the successive operation of the lens. The same is true for each of the other lenses 16—20. Due to the sequential operation of the lenses, the waves of each series alternate in regular sequence with the waves of the other series, thus producing a composite video signal at the output of the transmitter tube 12.

Figure 2:
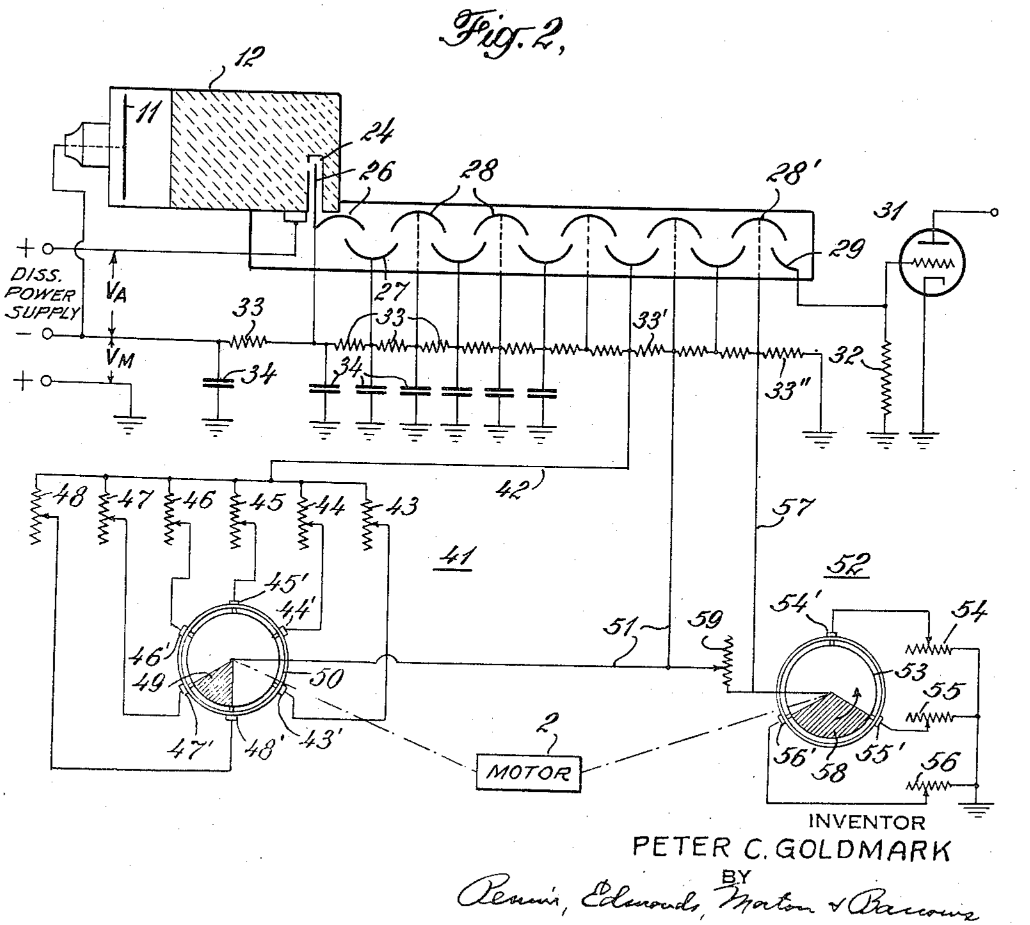
Fig. 2 is a schematic circuit diagram illustrating one embodiment of the invention for color balancing and flicker control.

Referring now to Fig. 2, color balancing and flicker control means are illustrated as applied to the apparatus of Fig. 1. The electron multiplier is actually contained within the apertured finger 24, but is here shown in developed view outside of the finger for convenience of illustration. The multiplier includes an initial electrode 26 which collects the electrons passing the aperture in the finger and emits secondary electrons to the next electrode 27. Successive secondary electron emissive electrodes 28 are provided for increasing the magnitude of the color video signal by secondary electron multiplication. These electrodes are often termed dynodes. A final collecting anode 29 is provided to deliver the multiplied video signal to the output circuit.

The output circuit is here shown as a preamplifier consisting of a triode 31 to the grid of which the video signal is applied across resistor 32. The cathode of tube 31 may be grounded as shown and the anode connected to a suitable output circuit. The preamplifier may be conventional and need not be described further.

Accelerating potentials are applied to the stages of the electron multiplier through a voltage divider comprising resistors 33. It is convenient to ground the output end of the voltage divider as shown and maintain the input end at a negative potential designated as $V_M$. In a typical operation $V_M$ might be of the order of 2,000 volts. By means of the voltage divider, successive secondary emissive electrodes or dynodes are maintained at successively increasing potentials so that the accelerating potential in each stage produces secondary emission at a ratio greater than unity, usually of the order of 4 or 5 to 1. The resistances in the voltage divider may be all of the same value, or one or more of them may be of different value if desired. By-pass capacitors 34 may be provided for the earlier stages of the multiplier.

The photoelectric cathode 11 of the transmitter tube is shown maintained at the negative potential $V_M$ and the finger 24 maintained positive thereto by a voltage $V_A$, which in practice may be of the order of 450 volts, for example. Voltages $V_A$ and $V_M$ may be obtained from suitable power supplies, not shown. Although the potential of the first multiplying electrode 26 is negative to that of finger 24, in the specific arrangement shown, it is positive to the photoelectric cathode 11 and hence multiplication may take place.

In accordance with the invention, the voltage or accelerating potential applied to one or more of the stages in the multiplier is sequentially varied to change the multiplication for successive portions of the color video signal passing therethrough. This may be done conveniently by shunting one or more resistors in the voltage divider by additional resistance whose value may be changed cyclically by means of a commutator.

Resistor 33′ is shunted by the flicker control means generally designated as 41. One end of the resistor is connected through lead 42 to variable resistors 43—48, and the movable contacts of the resistors are connected to respective brushes 43′—48′ equally spaced on the brush holder of commutator 50. The commutator has a rotating conductive segment 49 driven at a suitable speed by motor 2. Appropriate means, such as a gear box, not shown, may be employed to obtain the desired speed of rotation. The conducting segment 49 includes an angle which is approximately that between adjacent brushes so that the brushes are successively engaged by the conducting segment. The conducting segment itself is connected through lead 51 to the other terminal of resistor 33′.

Variable resistors 43—48 are preferably equal in number to the small lenses 15—20 of Fig. 1, and the speed of rotation of commutator 50 is such that one variable resistor, say 43, is in operation during the operation of one of the small lenses, say lens 15. The next variable resistor 44 is in operation for the next lens 16, etc. Assuming, for example, that the lenses are changed for successive fields at the rate of 144 fields per second, the commutator is driven at 1440 R. P. M. Change from one commutator brush to the next of course takes place during the field blanking intervals.

By individually adjusting variable resistors 43—48, the amount of resistance shunting 33′ may be changed sequentially in synchronism with the sequential operation of lenses 15—20. Thus the accelerating potential applied to the corresponding stage of the electron multiplier will be sequentially changed in synchronism with the successive operation of the optical paths through the small lenses. In this manner the multiplication of the video signal may be changed sequentially to alter the balance between video signal portions corresponding to different optical paths. By suitable adjustment, the video signals corresponding to the several optical paths may be equalized.

After adjustment, the accelerating potential applied during the operation of a given lens, say 15, will remain constant so that the multiplication of the corresponding series of signal waves will remain constant. Thus no distortion results.

The last resistor 33′′ in the voltage divider is also shunted by cyclically changing resistance under the control of the color balancing commutator generally designated as 52. It is assumed that three colors, say, red, blue and green, are alternating in regular sequence so that commutator 53 is provided with three brushes 54′, 55′ and 56′ connected respectively to the variable contacts of variable resistors 54, 55 and 56. The other terminals of the variable resistors are grounded as shown, inasmuch as one terminal of resistor 33′′ is grounded. The other terminal of the latter resistor is connected through lead 57 to the rotating conducting segment 58 of the commutator. This conducting segment includes an angle substantially equal to the spacing of the brushes so that the brushes are successively engaged.

Assuming, for example, that the colors are changed for successive fields at the rate of 144 fields per second, the commutator is driven at a speed of 2880 R. P. M. by motor 2. Thus variable resistor 54 will be in operation during fields of one color, say red, variable resistor 55 will be in operation for fields of a different color, say green, etc. By adjusting the values of the variable resistors 54—56, the accelerating potential applied to the corresponding multiplier stage may be cyclically varied in synchronism with the sequential change of color in the video signal. In this case the stage is the final or output stage between the last secondary emissive dynode 28′ and the collector 29. Accordingly, the magnitude of those portions of the video signal representing one component color may be altered with respect to those portions representing another component color.

Similarly to the flicker control operation, after adjustment the voltage applied to the output stage of the multiplier remains constant for signal components of a given color, say red. The same is true for each of the other colors. Thus no distortion of signal components of a given color results.

It might be mentioned that with a well regulated power supply, when the resistance in the voltage divider for any one stage is changed, there will be a slight redistribution of voltage in all the other stages. The effect of the redistribution may to some extent oppose the initial change, but has not been found troublesome in practice.

In Fig. 2 the flicker control commutator 50 is provided with one brush for each optical path, and the color balancing communtator 53 is provided with one brush for each color. If desired, one or more brushes could be omitted on the flicker control commuator, leaving the video signal unchanged for the corresponding optical paths. Similarly, one or more brushes could be omitted on the color balancing commutator so as to leave corresponding color portions of the video signal unchanged.

The brush holders of commutators 50 and 53 can be made rotatable to adjust the phases of the respective commutators, or the commutator rotors may be mechanically phased. Separate synchronous motors may be employed if desired, and the stators of the motors rotated for phasing. If, however, the shutter disk 21 in Fig. 1 has six slots so as to rotate one revolution for the sequential exposure of all six lenses, commutator 50 could be mounted on the shaft of the shutter disk, thus requiring only initial phase adjustment. Similarly, if color disk 22 had three color filter segments, commutator 52 could be mounted on its shaft, thus requiring only initial phase adjustment. Of course, if the color filter disk 22 had, say six segments, commutator 52 could be provided with six brushes connected in pairs and again mounted on a common shaft. Various arrangements of this type will occur to those skilled in the art.

Since color balancing and flicker control is obtained by varying the accelerating potentials applied to stages of the electron multiplier, no distortion of the video signal results. The arrangement described is extremely simple and reliable, and has proved to be very effective in operation.

It is often desirable to have an over-all gain control for the composite color video signal passing through the multiplier and this is conveniently obtained, as shown in Fig. 2, by providing a variable resistor 59 in shunt with one or more of the resistors 33 in the voltage divider.

Figure 3:
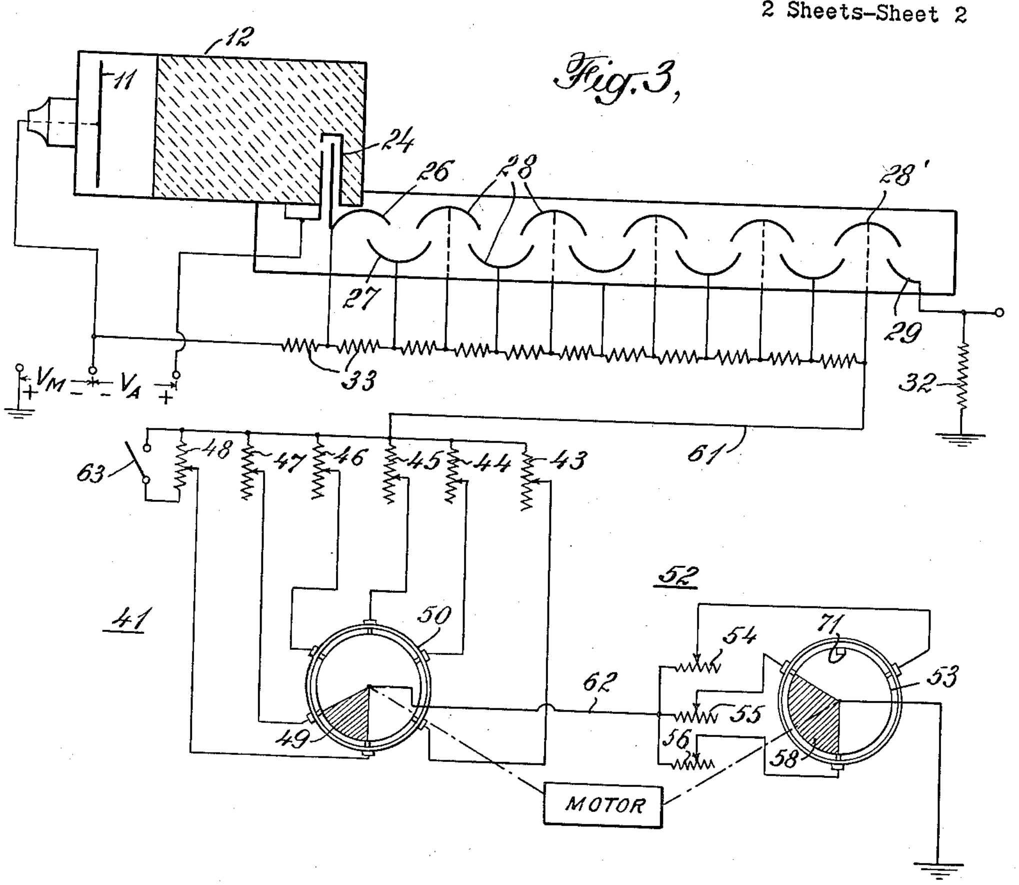
Fig. 3 is another embodiment of the invention for color balancing and flicker control.

Referring now to Fig. 3, an embodiment generally similar to Fig. 2 is shown except that the color balancing and flicker control means are in series and jointly control the potential difference applied to the final stage of the multiplier. Instead of shunting a fixed resistor with a commutator controlled resistance, the latter is used in place of the fixed resistor.

As in Fig. 2, the multiplier is shown in developed form, although it actually is built in the form of small boxes and located in the apertured finger 24. The output electrode 29 is actually in the form of a screen and located between the last two secondary emissive electrodes. This structure is well known in the art and the developed form shown is more convenient for illustration. Similar numerals are used for similar elements in Figs. 2 and 3 so that the general explanation need not be repeated.

As shown, the last multiplying electrode 28′ is connected through lead 61 to the variable resistors 43—48 of the flicker control 41. The conducting segment 49 of the flicker control commutator 50 is connected through lead 62 to the variable resistors 54—56 of the color balancer 52. The conducting segment 58 of the color balancing commutator 53 is grounded.

The operation of the system of Fig. 3 will be clear from the previous description of Fig. 2. The resistance in the commutator circuits between leads 61 and ground in effect replaces the resistance 33′′ of Fig. 2. The settings of variable resistors 43—48 and 54—56 determine the resistance to ground at any one instant and hence the potential applied through the voltage divider to multiplying electrode 28′. Each of resistors 43—48 operates for a full field scansion, and each of resistors 54—56 operates for a full field scansion. Thus the total series resistance is unchanged during a given field scansion, the changes taking place in the field blanking intervals. When in operation, the commutators jointly control the voltage to the output stage of the multiplier.

Fig. 3 introduces an additional feature to assist in properly phasing the flicker control commutator 50. In practice it is desirable that a given variable resistor, say 48, be always associated with a given optical path, say the path through lens 20 of Fig. 1. If the commutator is not on the shaft of the shutter disk as described hereinbefore, it is possible that when the appartus is put into operation the proper relationship will not obtain. By closing switch 63 variable resistor 48 is short-circuited, thus altering the potential applied to electrode 28′. By covering up lens 20 in the film scanner, the selector disk may easily be phased until, on an oscilloscope, the blanked-out field corresponding to lens 20 corresponds to the changed amplification for the field corresponding to variable resistor 48. When this has been accomplished, switch 63 may be opened and lens 20 uncovered for normal operation. This feature has the advantage that the knobs controlling variable resistors 43—48 remain unchanged during the phasing operation so that previous adjustments of the variable resistors will not be disturbed.

Proper adjustment of the variable resistors 43—48 in the flicker control of Figs. 2 and 3 can be readily determined by the use of an oscilloscope. For example, with the color disk stationary or removed from the scanner, and the six variable resistors set, say, at maximum, the condenser lens 7 and arc may be adjusted until on the oscilloscope the corresponding six fields show the same light distribution. Then, the variable resistors 43—48 may be adjusted until the field signals are all of the same amplitude. Initial adjustments may be made with the oscilloscope showing all six fields side by side, and final adjustments with the oscilloscope showing all six fields superimposed. If desired, the color disk could be kept in operation and the oscilloscope adjusted to show three fields side by side corresponding to the three different colors. With proper adjustment of the flicker control knobs, each color field should remain motionless, although fields of different color will be of different amplitude.

It is desirable in a color television system of this type to transmit a special color synchronizing signal to enable proper synchronization of transmitter color analysis with receiver color synthesis. For example, if color filter disks are used at both transmitter and receiver, they should rotate at synchronous speeds and in proper phase relationship. This can be obtained readily if the color synchronizing signal is transmitted with each field of a given color. For three colors and 144 fields per second, this results in a 48-cycle color synchronizing pulse.

At the transmitter the color filter disk must be phased so that the color synchronizing pulse is always associated with the proper color, say red. The color balancing commutator should also have the same phase relationship so that a given variable resistor will always be associated with the same color. This may be accomplished readily by the apparatus shown in Figs. 4 and 5.

Figure 4:
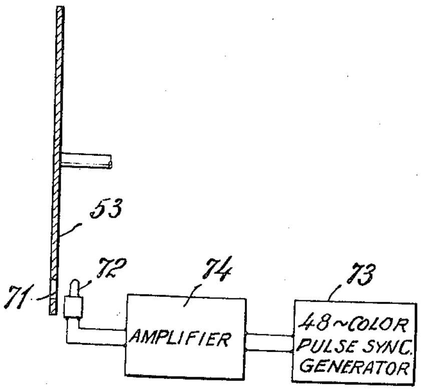
Fig. 4 is a diagram illustrating apparatus utilized for color phasing.

Referring first to Fig. 4, the rotating element of the commutator 53 is provided with a slot 71 behind which a small flash lamp 72, such as a neon lamp, is mounted. The neon lamp is energized by the color synchronizing signal from generator 73 through a suitable amplifier 74. Then, by mechanically phasing the commutator rotor 53 until the flashing of lamp 72 is observed through slot 71, proper phasing can readily be obtained.

Figure 5:
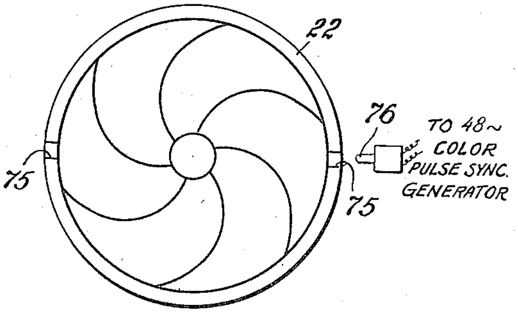
Fig. 5 illustrates another embodiment useful for color phasing.

In Fig. 5, the color filter disk 22 is provided with two slots 75, since there are two sets of red, green, blue filters on the disk. Flash lamp 76 is mounted behind the disk, but is here shown to one side for convenience of illustration. The flash lamp 76 is energized by color synchronizing signals in the same manner as in Fig. 4 and, when the flashes are observed through slot 75, the color filter disk will be in proper phase. It is, of course, necessary to initially locate the slots properly with respect to the proper color filters so that this phasing adjustment gives the proper overall operation.

It is helpful in obtaining accuracy of phasing to have the slot widths in Figs. 4 and 5 of the order of one-tenth the duration of a field. Of course, if the commutator and color disk are mounted on the same shaft, as discussed hereinbefore, only one lamp phasing mechanism is required. Instead of actually putting slots in the color filter disk or commutator rotor, it would be possible to provide a separate element containing one or more slots for the purpose.

In many applications the joint use of color balancing and flicker control will not be necessary. In such case one or the other may be omitted. Also, instead of having the variable resistors associated with a single commutator control the voltage applied to the same stage or stages of the multiplier, they could be connected to control the voltage to different stage or stages. Likewise a single commutator could be replaced by several commutators in suitable phase relationship.

The use of commutators associated with the voltage divider is preferred for simplicity and reliability. If desired, however, other means could be employed for sequentially altering the voltage applied to one or more stages of the multiplier.

Changes in voltage with successive fields during field blanking intervals has been described in the foregoing specific embodiments since that is of most importance at the present time. However, if for any reason it is desired to change the balance of signal portions of other than field duration, the embodiments can readily be modified by suitable alterations in the commutator circuits and their synchronization.

It will be apparent that many different applications of the invention described herein are possible. Also, many modifications may be made by those skilled in the art within the scope of the invention.

I claim:

1. In a television system, the combination which comprises means including an electronic transmitter tube for sequentially scanning an object field to produce a composite video signal having several successive portions alternating in regular sequence, an electron multiplier in said transmitter tube having secondary electron multiplying and output stages for multiplying said composite video signal, and means for sequentially applying a plurality of individually alterable voltages above cutoff to at least one of said stages which multiplies said composite video signal in synchronism with the sequential alternations of said portions of the video signal, whereby the balance between said portions in the video signal may be altered.

2. In a television system, the combination which comprises means including an electronic transmitter tube for sequentially scanning an object field to produce a composite video signal having several series of signal waves, the waves of said several series alternating in regular sequence, an electron multiplier in said transmitter tube having secondary electron multiplying and output stages for multiplying said composite video signal, and means for applying sequentially a plurality of individually alterable accelerating potentials above cutoff to at least one of said stages which multiplies said composite video signal in synchronism with the sequential alternations of said series of signal waves to change the relative magnitude of one series of waves with respect to another series, whereby the balance between said series in the video signal may be altered.

3. In a television system, the combination which comprises means including an electronic transmitter tube for sequentially scanning an object field to produce a composite video signal having several series of signal waves, the waves of said several series alternating in regular sequence, an electron multiplier in said transmitter tube having secondary electron multiplying and output stages for multiplying said composite video signal, and voltage supply means for applying accelerating potentials to said stages, said voltage supply means including means for sequentially altering the accelerating potential applied to at least one of said stages which multiplies said composite video signal in synchronism with the sequential alternations of said series of signal waves, the sequential values of the accelerating potential being above cutoff and individually variable to change the relative magnitude of one series of waves with respect to another series, whereby the balance between said series in the video signal may be altered.

4. In a television system, the combination which comprises means including an electronic transmitter tube for sequentially scanning an object field to produce a composite viedo signal having several series of signal waves, the waves of said several series alternating in regular sequence, an electron multiplier in said transmitter tube having secondary electron multiplying and output stages for multiplying said composite video signal, and voltage supply means for applying accelerating potentials to said stages, said voltage supply means including means for sequentially applying a plurality of different accelerating potentials of individually adjustable magnitude above cutoff to at least one of said stages which multiplies said composite video signal in synchronism with the sequential alternations of said series of signal waves, said accelerating potentials being constant after adjustment for respective series of signal waves, whereby the balance between said series in the video signal may be altered.

5. In a television system, the combination which comprises means including an electronic transmitter tube for sequentially scanning an object field to produce a composite video signal having several series of signal waves, the waves of said several series alternating in regular sequence, an electron multiplier in said transmitter tube having secondary electron multiplying and output stages for multiplying said composite video signal, a voltage divider for applying accelerating potentials to said stages, and commutator means associated with said voltage divider for sequentially changing the accelerating potential applied to at least one of said stages which multiplies said composite video signal to different individually adjustable values above cutoff, said commutator being synchronized with the sequential alternations of said series of waves to change the relative magnitude of one series of waves with respect to another series, whereby the balance between said series in the video signal may be altered.

6. In a television system, the combination which comprises means including an electronic transmitter tube for sequentially scanning an object field to produce a composite video signal having several series of signal waves, the waves of said several series alternating in regular sequence, an electron multiplier in said transmitter tube having secondary electron multiplying and output stages for multiplying said composite video signal, a resistance voltage divider for applying accelerating potentials to said stages, a commutator, a plurality of variable resistors sequentially connected to said voltage divider by said commutator for sequentially changing the accelerating potential applied to at least one of said stages which multiplies said composite video signal to different individually adjustable values above cutoff, said commutator being synchronized with the sequential alternations of said series of waves to change the relative magnitude of one series of waves with respect to another series, whereby the balance between said series in the video signal may be altered.

7. In a color television system, the combination which comprises means including an electronic transmitter tube for producing a sequential composite multicolor video signal of which successive portions represent several different component colors of an object field, an electron multiplier in said transmitter tube having secondary electron multiplying and output stages for multply-ing said composite multicolor video signal, and means for applying sequentially a plurality of individually alterable accelerating potentials above cutoff to at least one of said stages which multiplies said composite video signal in synchronism with the sequential change of color of said video signal, whereby the magnitude of those portions of the video signal representing one component color may be altered with respect to those portions representing another component color.

8. In a color television system, the combination which comprises means including an electronic transmitter tube for producing a sequential composite multicolor video signal of which successive portions represent several different component colors of an object field, an electron multiplier in said transmitter tube having secondary electron multiplying and output stages for multiplying said composite multicolor video signal, voltage supply means for applying accelerating potentials to said stages, said voltage supply means including means for sequentially applying different accelerating potentials of individually adjustable magnitude above cutoff to at least one of said stages which multiplies said composite multicolor video signal in synchronism with the sequential change of color of said video signal, said accelerating potentials being constant after adjustment for respective portions of the multicolor video signal, whereby the color balance of said multicolor video signal may be altered.

9. In a color television system, the combination which comprises means including an electronic transmitter tube for producing a sequential composite multicolor video signal of which successive portions represent several different component colors of an object field, an electron multiplier in said transmitter tube having secondary electron multiplying and output stages for multiplying said composite multicolor video signal, voltage supply means for applying accelerating potentials to said stages, said voltage supply means including means for sequentially applying different accelerating potentials of individually adjustable magnitude above cutoff to said output stage in synchronism with the sequential change of color of said video signal, said accelerating potentials being constant after adjustment for respective portions of the multicolor video signal, whereby the color balance of said multicolor video signal may be altered.

10. In a color television system, the combination which comprises means including an electronic transmitter tube for producing a sequential composite multicolor video signal of which successive portions represent several different component colors of an object field, an electron multiplier in said transmitter tube having secondary electron multiplying and output stages for multiplying said composite multicolor video signal, a voltage source and voltage divider for applying accelerating potentials to said stages, and a commutator associated with said voltage divider for sequentially changing the accelerating potential applied to at least one of said stages which multiplies said composite multicolor video signal to different individually adjustable values above cutoff, said commutator being synchronized with the sequential change of color of said video signal to change the relative magnitude of signal portions representing one color with respect to portions representing another, whereby the color balance of said multicolor video signal may be altered.

11. In a color television system, the combination which comprises means including an electronic transmitter tube for producing a sequential composite multicolor video signal of which successive portions represent several different component colors of an object field, an electron multiplier in said transmitter tube having secondary electron multiplying and output stages for multiplying said composite multicolor video signal, a voltage source and resistance voltage divider having sections for applying accelerating potentials to said stages, a commutator circuit arranged to connect sequentially different adjustable resistances in shunt with the section of said voltage divider supplying said output stage, the values of the adjustable resistances being sufficiently high to maintain the voltage of said output stage above cutoff, said commutator being synchronized with the sequential change of color of said video signal to change the relative magnitude of signal portions representing one color with respect to portions representing another, whereby the color balance of said multicolor video signal may be altered.

12. In a television system, the combination which comprises an electronic transmitter tube for scanning light images presented thereto and producing a corresponding video signal, means for presenting light images to said tube successively through several optical paths to produce a composite video signal, an electron multiplier in said transmitter tube having secondary electron multiplying and output stages for multiplying said composite video signal, and means for applying sequentially a plurality of individually alterable accelerating potentials above cutoff to at least one of said stages which multiplies said composite video signal in synchronism with the successive operation of said several optical paths, whereby the balance between video signal portions corresponding to different optical paths may be altered.

13. In a television system, the combination which comprises an electronic transmitter tube for scanning light images presented thereto and producing a corresponding video signal, means for presenting light images to said tube successively through several optical paths to produce a composite video signal, an electron multiplier in said transmitter tube having secondary electron multiplying and output stages for multiplying said composite video signal, voltage supply means for applying accelerating potentials to said stages, said voltage supply means including means for sequentially applying different accelerating potentials of individually adjustable magnitude above cutoff to at least one of said stages which multiplies said composite video signal in synchonism with the successive operation of said several optical paths, said accelerating potentials being constant after adjustment for respective portions of the video signal corresponding to different optical paths, whereby the balance between video signal portions corresponding to different optical paths may be altered.

14. In a television system, the combination which comprises an electronic transmitter tube for scanning light images presented thereto and producing a corresponding video signal, means for presenting light images to said tube successively through several optical paths to produce a composite video signal, an electron multiplier in said transmitter tube having secondary electron multiplying and output stages for multiplying said composite video signal, a resistance voltage divider for applying accelerating potentials to said stages, a commutator, a plurality of variable resistors sequentially connected to said voltage divider by said commutator for sequentially changing the potential applied to at least one of said stages which multiplies said composite video signal to different individually adjustable values above cutoff, said commutator being synchronized with the successive operation of said several optical paths whereby the balance between video signal portions corresponding to different optical paths may be altered.

15. In a color television system, the combination which comprises an electronic transmitter tube for scanning light images presented thereto and producing a corresponding video signal, means for successively presenting light images of several different primary colors to said tube successively through different optical paths to produce a composite multicolor video signal, an electron multiplier in said transmitter tube having secondary electron multiplying and output stages for multiplying said composite multicolor video signal, voltage supply means for applying sequentially a plurality of individually alterable accelerating potentials above cutoff to at least one of said stages which multiplies said composite signal in synchronism with the sequential change of color of said multicolor video signal, and voltage supply means for applying sequentially a plurality of individually alterable accelerating potentials above cutoff to at least one of said stages which multiplies said composite signal in synchronism with the successive operation of said several optical paths, whereby color balance in the multicolor video signal may be altered and flicker reduced.

16. In a color television system, the combination which comprises an electronic transmitter tube for scanning light images presented thereto and producing a corresponding video signal, means for presenting to said tube light images of several different primary colors successively at field scanning frequency through several different optical paths operating successively at field scanning frequency, thereby producing a composite multicolor video signal, an electron multiplier in said transmitter tube having secondary electron multiplying and output stages for multiplying said composite multicolor video signal, voltage supply means for applying a plurality of individually alterable accelerating potentials above cutoff to at least one of said stages which multiplies said composite signal, said potentials sequentially changing at field scanning frequency in synchronism and cyclically with the sequential change of color of said mulitcolor video signal, and voltage supply means for applying a plurality of individually alterable accelerating potentials above cutoff to at least one of said stages which multiplies said composite signal, the second-named potentials sequentially changing at field scanning frequency in synchronism and cyclically with the successive operation of said several optical paths, whereby color balance in the multicolor video signal may be altered and flicker reduced.

17. In a television system utilizing a sequential composite video signal having several series of signal waves, the waves of said several series alternating in regular sequence, in combination, means including an electron multiplier having secondary electron multiplying and output stages for multiplying said composite video signal, and means for applying sequentially a plurality of individually alterable accelerating potentials above cutoff to at least one of said stages which multiplies said composite video signal in synchronism with the sequential alternations of said series of signal waves to change the relative magnitude of one series of waves with respect to another series, whereby the balance between said series in the video signal may be altered.

18. In a television system utilizing a composite video signal having several successive portions alternating in regular sequence, means including an electron multiplier having secondary electron multiplying and output stages for multiplying said composite video signal, voltage supply means for applying accelerating potentials to said stages, said voltage supply means including means for sequentially applying a plurality of different accelerating potentials of individually adjustable magnitude above cutoff to at least one of said stages which multiplies said composite video signal in synchronism with the sequential alternations of said portions of the video signal, whereby the balance between said portions in the composite video signal may be altered.

19. In a television system utilizing a sequential composite video signal having several series of signal waves, the waves of said several series alternating in regular sequence, in combination, an electron multiplier supplied with said composite video signal, said electron multiplier having a series of secondary electron multiplying and output electrodes for multiplying said composite video signal, a voltage supply for applying accelerating potentials to said series of electrodes, and a sequentially operating voltage control device associated with said voltage supply and connected to alter sequentially to a plurality of different individually adjustable values above cutoff the accelerating potential between two of said electrodes carrying said composite video signal, thereby altering the amplification thereof, said voltage control device being synchronized with the sequential alternations of said series of signal waves to change the relative magnitude of one series of waves with respect to another series, whereby the balance between said series in the composite video signal may be altered.

20. In a television system, the combination which comprises scanning apparatus including an electronic transmitter tube for sequentially scanning an object field to produce a composite video signal having several successive portions alternating in regular sequence, an electron multiplier in said transmitter tube having a series of secondary electron multiplying and output electrodes for multiplying said composite video signal, a voltage supply for applying accelerating potentials to said series of electrodes, and a sequentially operating voltage control device associated with said voltage supply and connected to alter sequentially the accelerating potential between two of said electrodes carrying said composite video signal to a plurality of different individually adjustable values above cutoff, thereby altering the amplification thereof, said voltage control device being synchronized with the sequential alternations of said portions of the video signal, whereby the balance between said portions may be altered.

21. In a television system, the combination which comprises scanning apparatus including an electronic transmitter tube for sequentially scanning an object field to produce a composite video signal having several successive portions alternating in regular sequence, an electron multiplier in said transmitter tube having a series of secondary electron multiplying and output electrodes for multiplying said composite video signal, a voltage divider for applying accelerating potentials to said series of electrodes, a commutator, a plurality of variable resistors sequentially connected to said voltage divider by said commutator to alter to different individually adjustable values above cutoff the accelerating potential between two of said electrodes carrying said composite video signal, thereby altering the amplification thereof, said commutator being synchronized with the sequential alternations of said portions of the video signal, whereby the balance between said portions may be altered.

PETER C. GOLDMARK.

REFERENCES CITED

The following references are of record in the file of this patent:

UNITED STATES PATENTS

| Number | Name | Date |
|---|---|---|
| 2,309,506 | Herbst | Jan. 26, 1943 |
| 2,315,288 | Knoop | Mar. 30, 1943 |
| 2,315,290 | Mattke | Mar. 30, 1943 |
| 2,315,291 | Mattke | Mar. 30, 1943 |
| 2,418,414 | Larson | Apr. 1, 1947 |